UNITED STATES PATENT OFFICE.

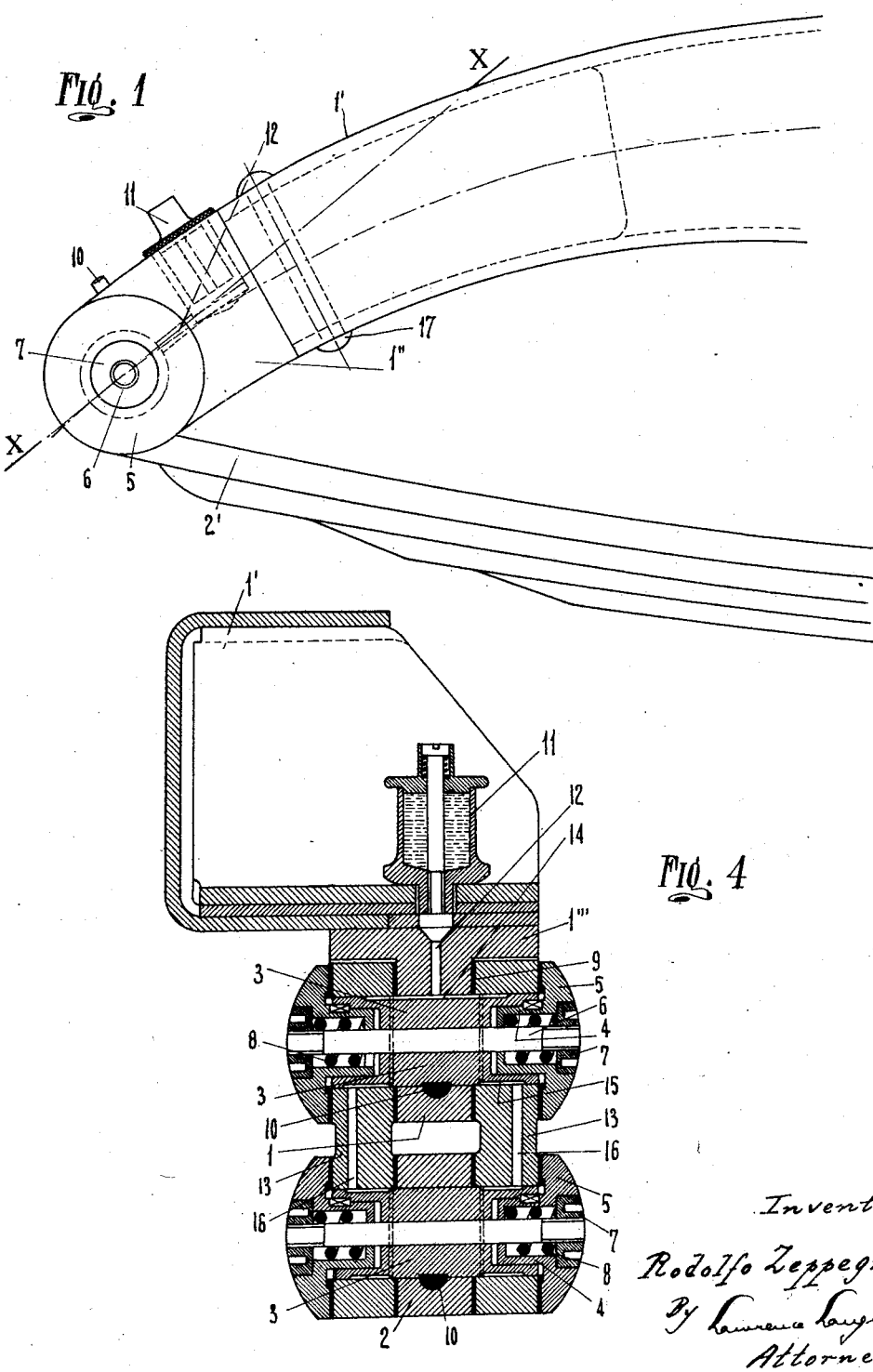

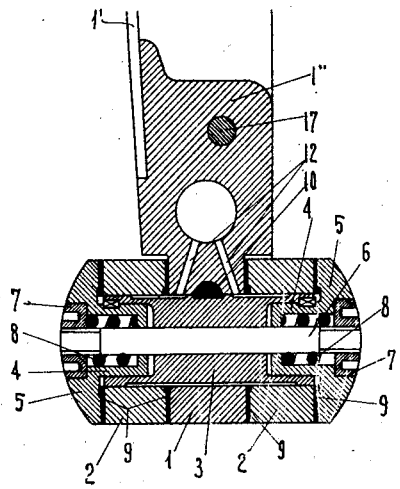
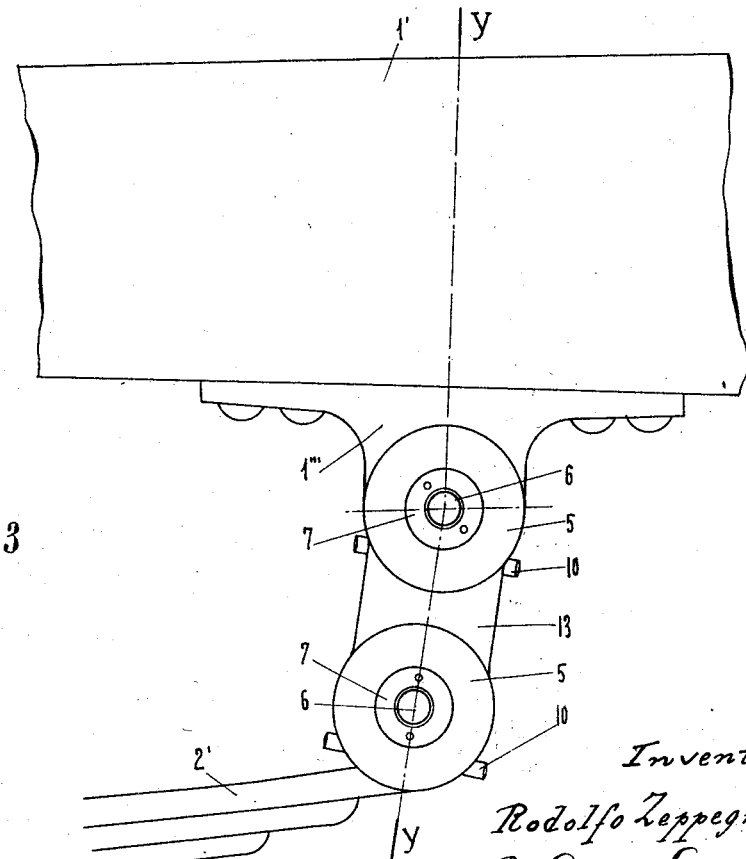

RODOLFO ZEPPEGNO, OF TURIN, ITALY, ASSIGNOR TO LANCIA & C., OF TURIN, ITALY, A CORPORATION OF ITALY.

VEHICLE SPRING.

1,406,134.  Specification of Letters Patent.  Patented Feb. 7, 1922.

Application filed September 17, 1920. Serial No. 410,936.

*To all whom it may concern:*

Be it known that I, RODOLFO ZEPPEGNO, a subject of the King of Italy, and resident of Turin, Italy, have invented certain new and useful Improvements in Vehicle Springs, of which the following is a specification.

This invention relates to vehicle springs and has for its object a device for connecting the springs with the frame which prevents any side play or lost motion from taking place between said parts.

On the annexed drawing is shown by way of example an embodiment of this invention and Figure 1 is a fragmentary side view of the front end of a frame bar and of the associate spring; Figure 2 is a section on line $x$—$x$ of Figure 1; Figure 3 is the fragmentary side view of the rear end of a front spring of a vehicle and of the adjacent portion of the frame bar; Figure 4 is the section on line $y$—$y$ of Figure 3.

As shown by said Figures 1 and 2 at the end on the frame bar 1' is fastened by means of a rivet 17 a member 1'' providing an eye 1, and the end of the main leaf 2' of the spring provides two eyes 2 embracing said eye 1. Said eyes 1 and 2 are engaged together by a hollow stud 3 of hardened metal passing through them and said stud is provided at each end with a recess in which is seated a hollow plug 4 solid with a head 5 resting against the outer side surface of the adjacent eye 2.

Said hollow stud 3 and plugs 4 provide a central hole in which is inserted a shank 6 having screw threaded ends on each of which is screwed a nut 7 seated in a proper recess of the adjacent head 5; a spring 8 is inserted between each nut 7 and the bottom of the recess of the associate plug 4.

The stud 3 and heads 5 are thus held in position by the shank 6 and nuts 7 and they provide a pivot connecting the spring with the frame bar; the wear of the associate parts is taken up by the springs 8 which hold the heads 5 in contact with the side faces of eyes 2 so as to prevent any side play or lost motion from taking place between said parts.

Proper washers 9 are inserted between heads 5 and eyes 2 and between eyes 2 and eye 1, and the stud 3 is made solid with the part 1 by means of a cotter or pin 10.

The lubrication of the pivot is obtained by means of an oil cup 11 feeding the oil in the space intermediate the stud 3 and the inner surface of eyes 1 and 2 through passages 12.

The above described device may also be used in connection with the shackles as shown in the construction of Figures 3 and 4.

In this construction the frame bar 1' carries a part 1''' providing an eye 1 in which a stud 3 is secured by a cotter 10; the spring leaf 2' provides an eye 2 in which is similarly secured another stud 3. Said studs 3 are interconnected by means of shackles 13. The construction of the pivots is similar to that above described and requires no further description.

The lubrication is obtained by means of an oil cup 11 leading to a passage 12 which feeds the oil on the upper stud 3; this stud is provided with an upper recessed portion 14 connected with two lower recesses 15 which lead to passages 16 provided in the shackles 13 and opening in recesses provided in the lower stud 3.

By means of the device according to this invention the springs are safely connected with the vehicle frame and the moving parts are always well lubricated; further any play or lost motion between the heads of the pivots and the side surfaces of the parts connected therewith is prevented and thus are avoided the shocks produced by said play during the running of the vehicle.

What I claim as my invention and desire to secure by United States Letters Patent is:—

1. A device for connecting the vehicle springs with the vehicle frame comprising a member solid with the frame and providing an eye, eyes on the end of the main spring leaf, a stud engaged in all said eyes, heads freely mounted on said stud, a shank passing through said stud and heads, nuts at the ends of said shank and springs located between said heads and nuts for forcing said heads against the adjacent parts.

2. A device for connecting the vehicle springs with the vehicle frame comprising a member solid with the frame and providing an eye, eyes on the end of the main spring leaf, a stud engaged in all said eyes, heads freely mounted on said stud, a shank passing through said stud and heads, nuts at the ends of said shank, springs located between said heads and nuts for forcing said heads against the adjacent parts and means for lubricating the contacting surfaces of said eyes and stud.

3. A device for connecting the vehicle springs with the vehicle frame comprising a member solid with the frame and providing an eye, eyes on the end of the main spring leaf, a stud engaged in all said eyes, recessed heads freely mounted on said stud, a shank passing through said stud and heads, nuts at the ends of said shanks and springs located in said recessed heads and bearing against said nuts for forcing said heads against the adjacent parts.

4. A device for connecting the vehicle springs with the vehicle frame comprising a member solid with the frame and providing an eye, a stud engaged in said eye, an eye on the end of the main spring leaf, a stud engaged in said spring eye, shackles pivoted on said studs and interconnecting the same, heads freely mounted on each stud, a shank passing through each stud and associate parts, nuts at the ends of each shank, springs located between said heads and nuts for forcing said heads against the adjacent parts and means for lubricating the contacting surfaces of said studs and shackles.

5. A device for connecting the vehicle springs with the vehicle frame comprising a member solid with the frame and providing an eye, a stud engaged in said eye, an eye at the end of the main spring leaf, a stud engaged in said spring eye, shackles pivoted on said studs and interconnecting the same, recessed heads freely mounted on each stud, a shank passing through each stud and associate parts, nuts at the end of each shank, springs located in said recessed heads and bearing against said nuts for forcing said heads against the adjacent parts and means for lubricating the contacting surfaces of said studs and shackles.

Signed at Turin, Italy, this 31st day of Aug., A. D. 1920.

RODOLFO ZEPPEGNO.